US012762216B2

(12) United States Patent
Wang et al.

(10) Patent No.: US 12,762,216 B2
(45) Date of Patent: Oct. 13, 2026

(54) DRIVING RECORD AUTHENTICATION METHOD, ELECTRONIC DEVICE, STORAGE MEDIUM

(71) Applicant: Fulian Precision Electronics (Tianjin) Co., LTD., Tianjin (CN)

(72) Inventors: Shih Chun Wang, New Taipei (TW); Yu-Wen Chen, New Taipei (TW); Shih-Yin Tseng, New Taipei (TW); Ting-Yu Du, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 239 days.

(21) Appl. No.: 17/972,764

(22) Filed: Oct. 25, 2022

(65) Prior Publication Data

US 2024/0061917 A1 Feb. 22, 2024

(30) Foreign Application Priority Data

Aug. 19, 2022 (CN) ......................... 202210999333.4

(51) Int. Cl.
*G06F 21/32* (2013.01)
*G06Q 20/38* (2012.01)

(52) U.S. Cl.
CPC ........... *G06F 21/32* (2013.01); *G06Q 20/389* (2013.01)

(58) Field of Classification Search
CPC ............. G06Q 20/401; G06Q 30/0241; G06Q 10/063112; G06F 21/6245; G06F 40/186; G06F 21/1014; G06F 30/15; G07C 5/008; G07C 9/00571; G07F 17/3241; G08G 1/00; B60W 50/14; H04W 4/02; H04W 12/069; H04W 4/40; B60N 2/0024; B60K 35/00; G06V 20/59; G06V 40/166; G06N 5/048; G05B 15/02; G01C 21/3602; H04L 9/3213; H04L 63/0853; A63F 13/792
See application file for complete search history.

(56) References Cited

U.S. PATENT DOCUMENTS

2014/0142805 A1* 5/2014 Frye ........................ B60K 35/00 701/36
2015/0210287 A1* 7/2015 Penilla ................. B60N 2/0024 701/49
2017/0206622 A1 7/2017 Kharbanov et al.
2017/0228683 A1* 8/2017 Hu ................. G06Q 10/063112
2018/0017405 A1* 1/2018 Chen ........................ H04W 4/02
2018/0091930 A1* 3/2018 Jefferies ............. G07C 9/00571
2018/0338241 A1* 11/2018 Li ........................... H04W 4/40
2019/0228328 A1* 7/2019 Ohazulike .............. G06N 5/048
2020/0027291 A1* 1/2020 Mizuno .................. G07C 5/008
2020/0349666 A1* 11/2020 Hodge ............... G01C 21/3602
(Continued)

FOREIGN PATENT DOCUMENTS

CN 111126880 5/2020
WO 2020015574 1/2020

*Primary Examiner* — Dustin Nguyen
(74) *Attorney, Agent, or Firm* — ScienBiziP, P.C.

(57) ABSTRACT

A driving record authentication method is provided. The method includes acquiring historical driving records of a driver and associated records of the driver. Once a non-fungible token image of the driver is minted based on the historical driving records and the associated records, the non-fungible token image is transmitted to a user terminal in response to a query request associated with the driver that sent the user terminal.

20 Claims, 9 Drawing Sheets

(56) References Cited

U.S. PATENT DOCUMENTS

| | | | | |
|---|---|---|---|---|
| 2021/0188289 | A1* | 6/2021 | Oba | G08G 1/00 |
| 2021/0221385 | A1* | 7/2021 | Jiang | B60W 50/14 |
| 2021/0370879 | A1* | 12/2021 | Julian | G06V 40/166 |
| 2022/0159314 | A1 | 5/2022 | Silberman-Sais et al. | |
| 2022/0311611 | A1* | 9/2022 | Gaur | H04L 9/3213 |
| 2022/0319260 | A1* | 10/2022 | Carter | G05B 15/02 |
| 2022/0358307 | A1* | 11/2022 | Coleman | G06V 20/59 |
| 2023/0009304 | A1* | 1/2023 | Jakobsson | G06Q 30/0241 |
| 2023/0162544 | A1* | 5/2023 | Hua | H04W 12/069<br>340/5.72 |
| 2023/0237277 | A1* | 7/2023 | Reza | G06F 40/186<br>704/9 |
| 2023/0325826 | A1* | 10/2023 | Exline | G06Q 20/401 |
| 2023/0386131 | A1* | 11/2023 | Witman | G06F 30/15 |
| 2023/0396442 | A1* | 12/2023 | Meyers | G07F 17/3241 |
| 2023/0396610 | A1* | 12/2023 | Berry | H04L 63/0853 |
| 2024/0100444 | A1* | 3/2024 | Samarthyam | A63F 13/792 |
| 2024/0126919 | A1* | 4/2024 | Ankrom | G06F 21/6245 |
| 2024/0265132 | A1* | 8/2024 | Zhao | G06F 21/6245 |
| 2025/0156506 | A1* | 5/2025 | Friesen | G06F 21/1014 |

* cited by examiner

DRIVING RECORD AUTHENTICATION METHOD, ELECTRONIC DEVICE, STORAGE MEDIUM

FIELD

The present disclosure relates to the field of blockchain technology, and in particular, to a driving record authentication method, an electronic device, a storage medium.

BACKGROUND

With the popularity of online car-hailing, taking a safety of hailing a car into consideration, a user (such as a passenger of taxi-hailing) may want to know a historical driving record of a driver of the car before actually hailing the car, the historical driving record may refer to violating traffic rules and accidents, the user may need to apply to the police authority to obtain the driving record. A process for applying the driving record is time-consuming and labor-intensive, and it is difficult to apply to real-life scenarios. If there is no record to check, it is difficult for the user to know the driving record of the driver.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
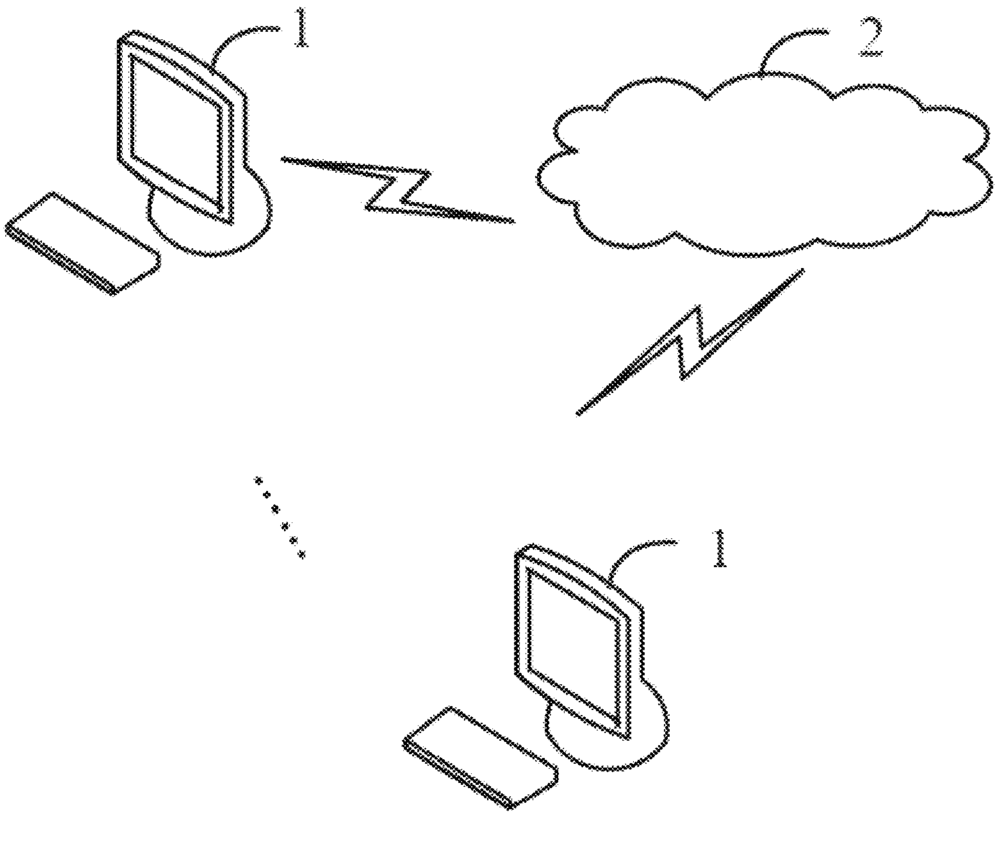
FIG. 1 is a schematic structural diagram of a blockchain provided by one embodiment of the present disclosure is applied.

Please refer to FIG. 1, which is a schematic structural diagram of a blockchain to which a driving record authentication method provided by one embodiment of the present disclosure is applied.

The driving record authentication method provided by the present disclosure is applied to an electronic device 1, and the electronic device 1 establishes a communication connection with a plurality of other electronic devices 1 through a network. A blockchain 2 is formed among the plurality of electronic devices 1, and each electronic device 1 is a node of the blockchain 2. The network may be a wired network or a wireless network, such as radio, wireless fidelity (WIFI), cellular, and the like.

Each electronic device 1 may be a device installed with a driving record authentication system, and the device installed with the driving record authentication system may be a personal computer, a server, etc., the server may be a single server, a server cluster, a cloud server, or the like.

Figure 2:
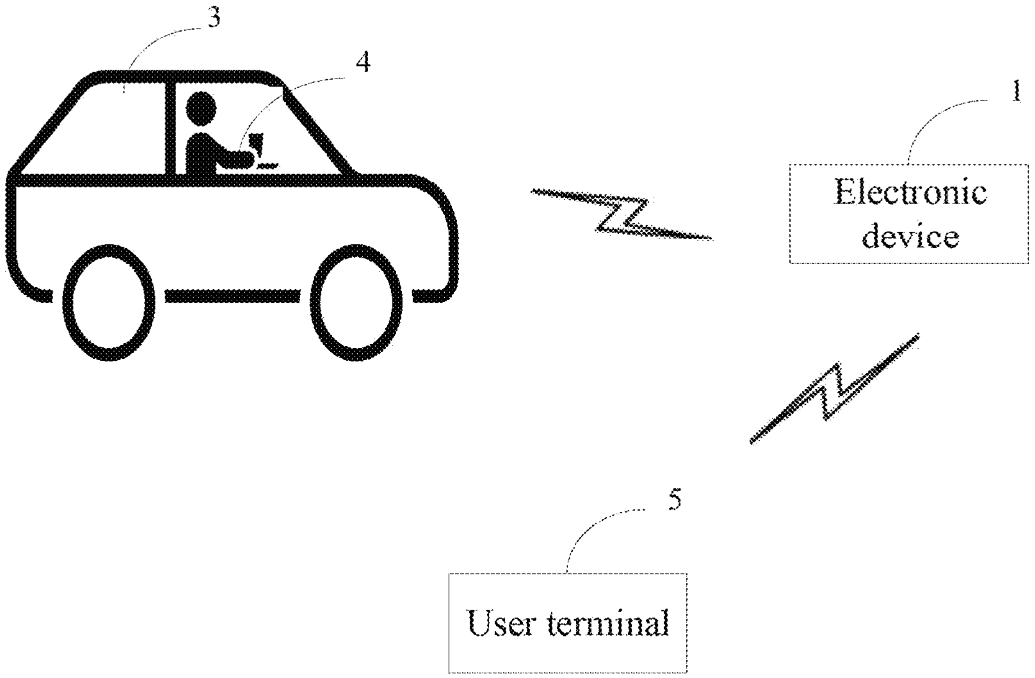
FIG. 2 is an application environment diagram of a driving record authentication provided by one embodiment of the present disclosure.

Please refer to FIG. 2, which is an application environment diagram of one embodiment of the driving record authentication of the present disclosure. In this embodiment, a driver 4 of a vehicle 3 can first register with the blockchain 2 to obtain a user account through the vehicle 3 or a user terminal 5, thereby realizing the user account being associated with identification information of the vehicle 3 (such as a license plate number and/or an engine number). The vehicle 3 may be a car, a ship, an aircraft or other suitable equipment. The user terminal 5 may be a mobile phone, a tablet computer, a server or other devices. The vehicle 3 can upload a real-time driving record of the vehicle 3 to the electronic device 1 when the vehicle 3 is driving, thereby the driving record of the vehicle 3 is stored by using the blockchain 2, so that the driving record cannot be tampered with, and an authenticity of the driving record is guaranteed. In addition, a smart contract program (such as a driving record authentication system mentioned in the context of this disclosure) in the electronic device 1 can obtain a level of the driver 4 based on the driving record corresponding to a preset period of time, and cast a non-fungible token (NFT) image corresponding to the level for the driver 4, and when a query request is received from the user terminal 5, the NFT image of the driver 4 is sent to the user terminal 5. Details are described later.

Figure 3:
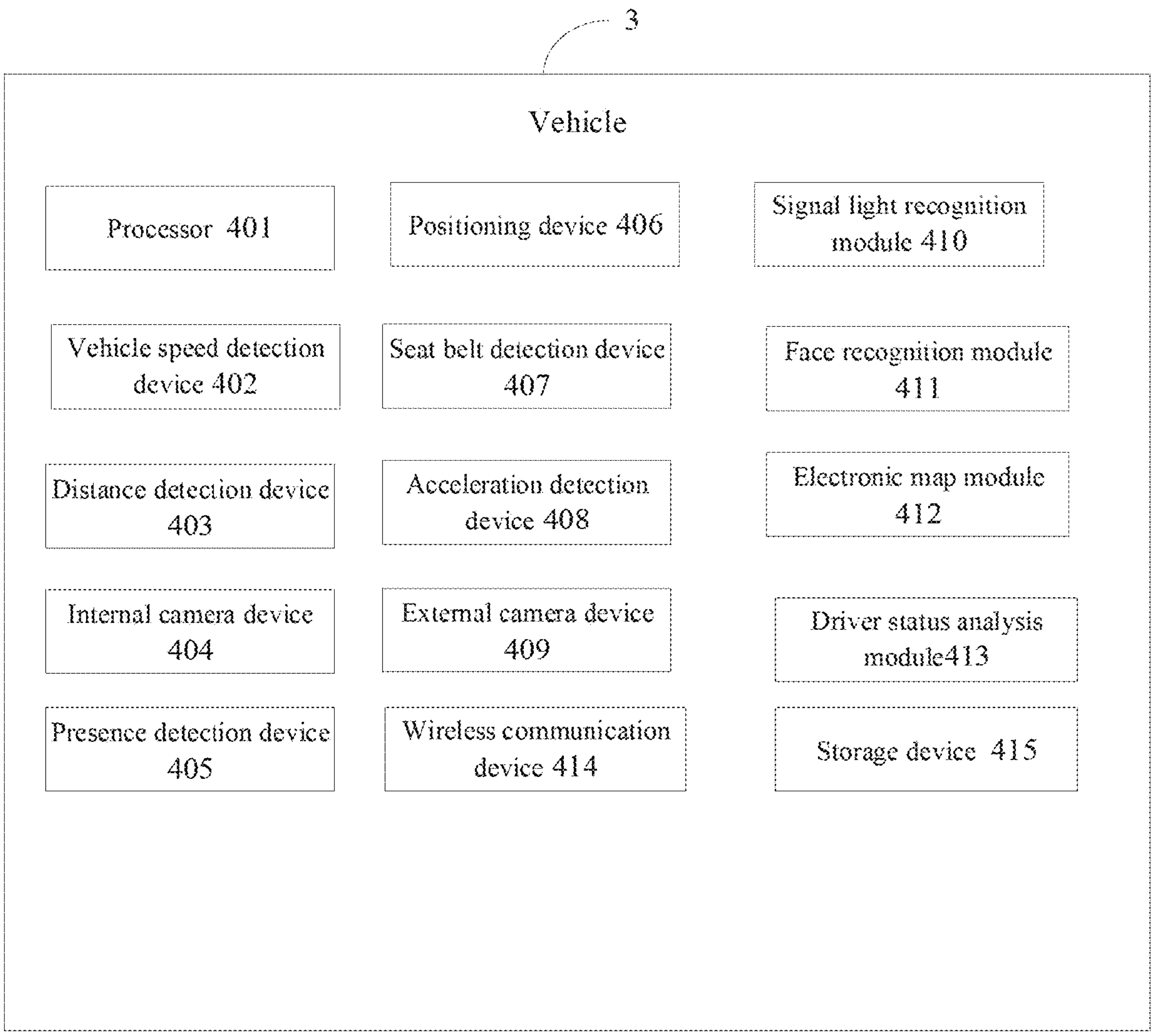
FIG. 3 is a schematic structural diagram of a vehicle according to one embodiment of the present disclosure.

Please refer to FIG. 3, which is a schematic structural diagram of a vehicle according to one embodiment of the present disclosure.

The vehicle 3 includes, but is not limited to: at least one processor 401, a vehicle speed detection device 402, a distance detection device 403, an internal camera device 404, a presence detection device 405, a positioning device 406, a seat belt detection device 407, an acceleration detection device 408, an external camera device 409, a wireless communication device 414. The vehicle 3 further includes a signal light recognition module 410, a face recognition module 411, an electronic map module 412, and a driver status analysis module 413.

In one embodiment, the vehicle speed detection device 402 may be a speed sensor for detecting a driving speed of the vehicle 3. The distance detection device 403 can be used to detect distances between the vehicle 3 and surrounding vehicles and/or surrounding objects. The internal camera device 404 may be a camera, which is used to capture images of a scene inside the vehicle 3, so that the vehicle 3 can obtain images of the driver 4 and passengers of the vehicle 3. The presence detection device 405 can be used to detect whether the driver 4 of the vehicle 3 is in a driving position.

In one embodiment, the positioning device 406 may locate a real-time position of the vehicle 3, and the positioning device 406 may be one or a combination of a Global Positioning System (GPS), an Assisted Global Positioning System (AGPS), BeiDou Navigation Satellite System (BDS), GLOBAL NAVIGATION SATELLITE SYSTEM (GLONASS) and other wireless communication devices.

In one embodiment, the seat belt detection device 407 is used to detect an use state of a seat belt, for example, it can detect whether the driver 4 of the vehicle 3 wears the seat belt. The acceleration detection device 408 is used to detect an acceleration of the vehicle 3. The external camera device 409 may be a camera, and is used to capture a scene in front of or around a driving direction of the vehicle 3. The signal light recognition module 410, the face recognition module 411, the electronic map module 412, and the driver status analysis module 413 may be software modules, which are stored in the storage device 415 of the vehicle 3. The signal light identification module 410 can recognize a traffic light (for example, a red light, a yellow light, a green light), traffic signs (for example, a go ahead sign, a turn sign, a U-turn sign, a speed limit sign, etc.), traffic markings of a road. The face recognition module 411 can recognize face information of the driver according to a face image of the driver captured by the internal camera device 404. The electronic map module 412 may be a preset electronic map, such as a Google map, a Baidu map, or the like. The processor 401 may obtain, based on the positioning device 406 and the electronic map module 412, traffic rules (for example, going straight, turning, or making a U-turn), traffic information (for example, whether there is a traffic congestion, an average speed, whether there are any traffic accidents nearby, etc.). The driver state analysis module 413 can analyze a mental state of the driver 4 according to the image of the driver 4 captured by the internal camera device 404, such as identifying whether the driver 4 is currently in a fatigued driving state, whether the driver 4 acts irregularities such as using a cell phone, smoking, etc.

In one embodiment, the processor 401 may transmit obtained data to the electronic device 1 through the wireless communication device 414. The obtained data can be data from the vehicle speed detection device 402, data from the distance detection device 403, data from the internal camera device 404, data from the presence detection device 405, data from the positioning device 406, and data from the seat belt detection device 407, data from acceleration detection device 408, data from the external camera device 409, data from the signal light recognition module 410, data from the face recognition module 411, data from the electronic map module 412 and data from the driver status analysis module 413.

Figure 4:
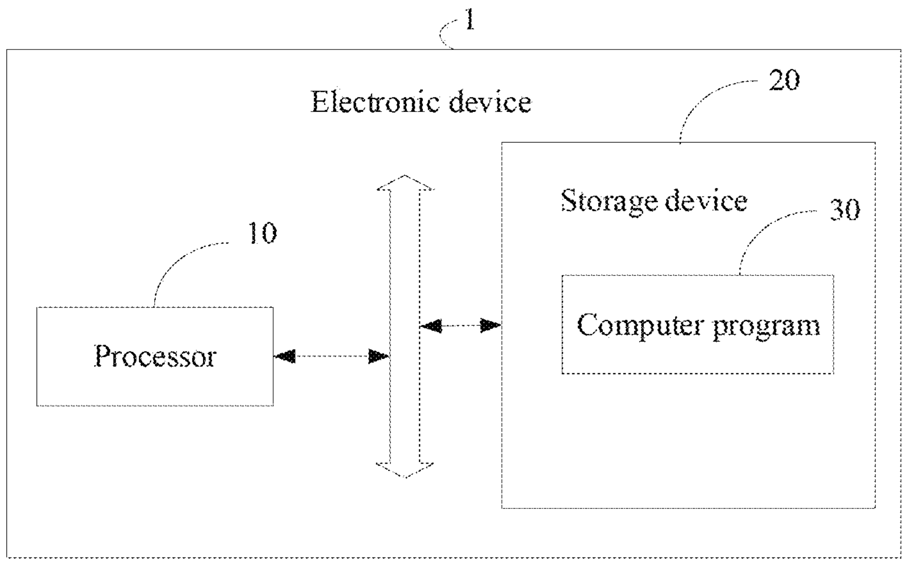
FIG. 4 is a schematic structural diagram of an electronic device according to one embodiment of the present disclosure.

Please refer to FIG. 4, which is a schematic structural diagram of one embodiment of the electronic device.

Figure 5:
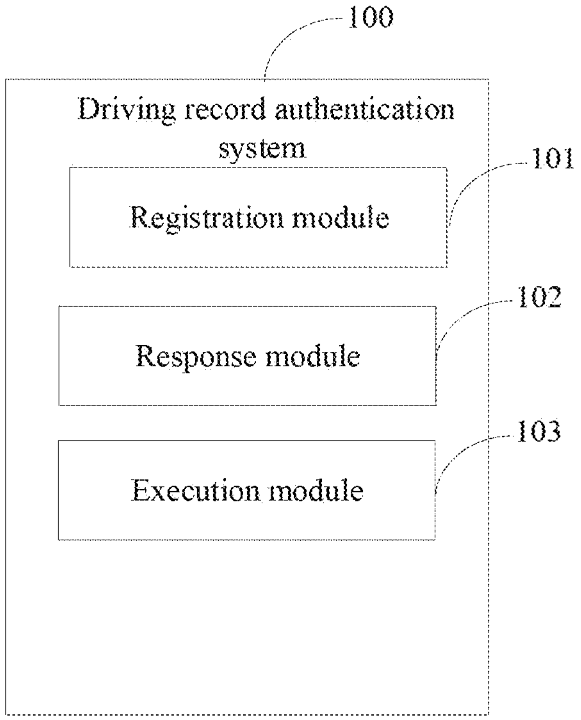
FIG. 5 is a functional block diagram of a driving record authentication system provided by one embodiment of the present disclosure.
Figure 6:
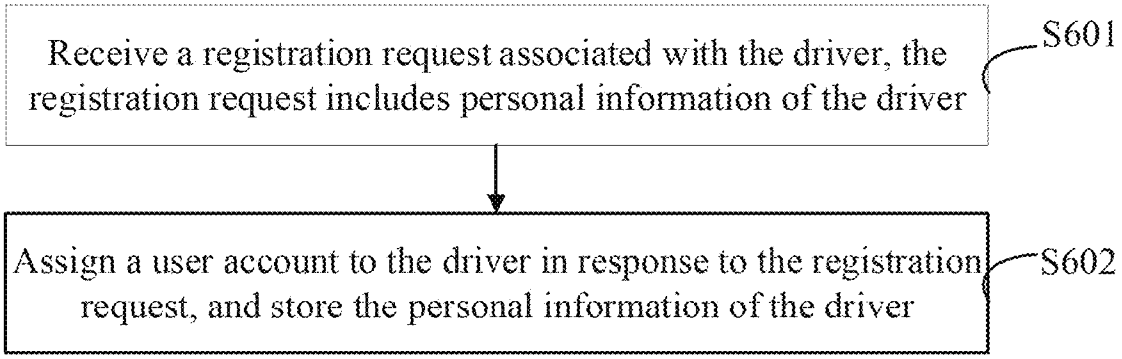
FIG. 6 is a flowchart of a method of registering a user account provided by one embodiment of the present disclosure.
Figure 7:
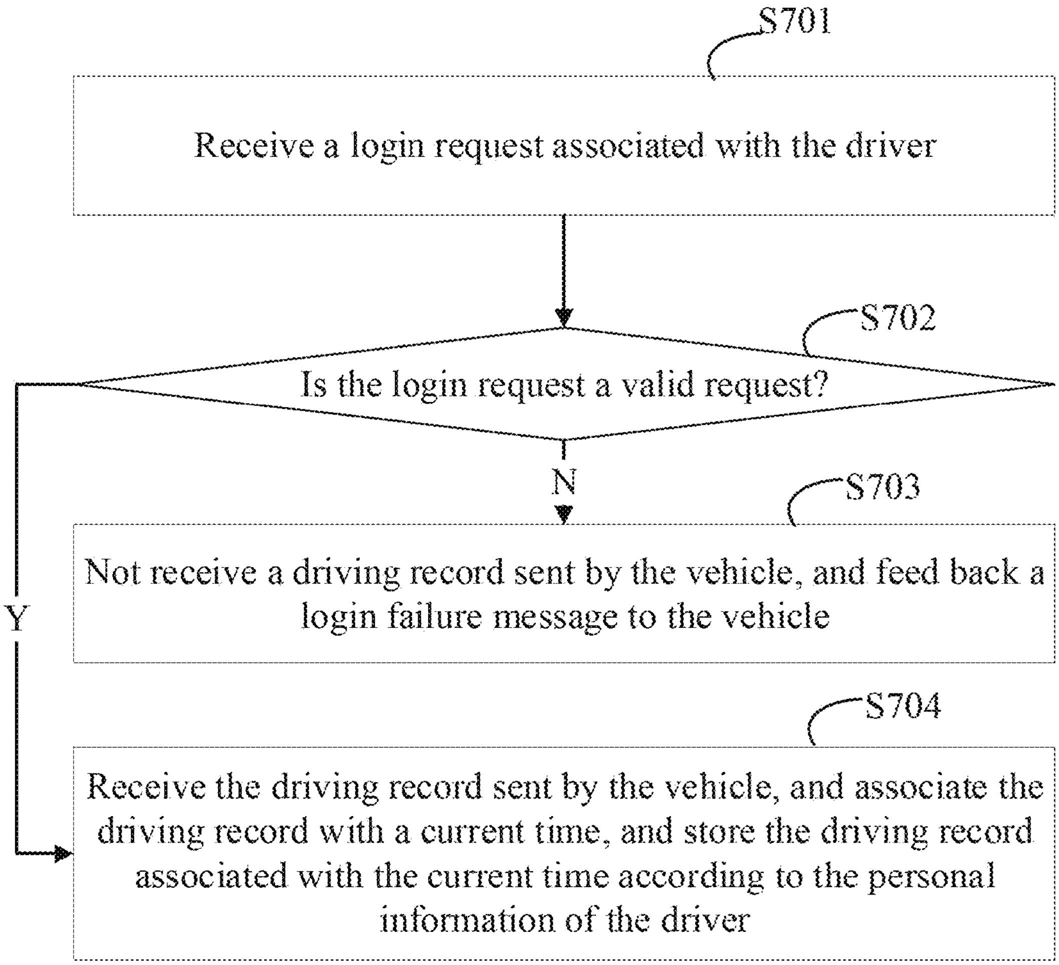
FIG. 7 is a flowchart of logging in the electronic device provided by one embodiment of the present disclosure.
Figure 8:
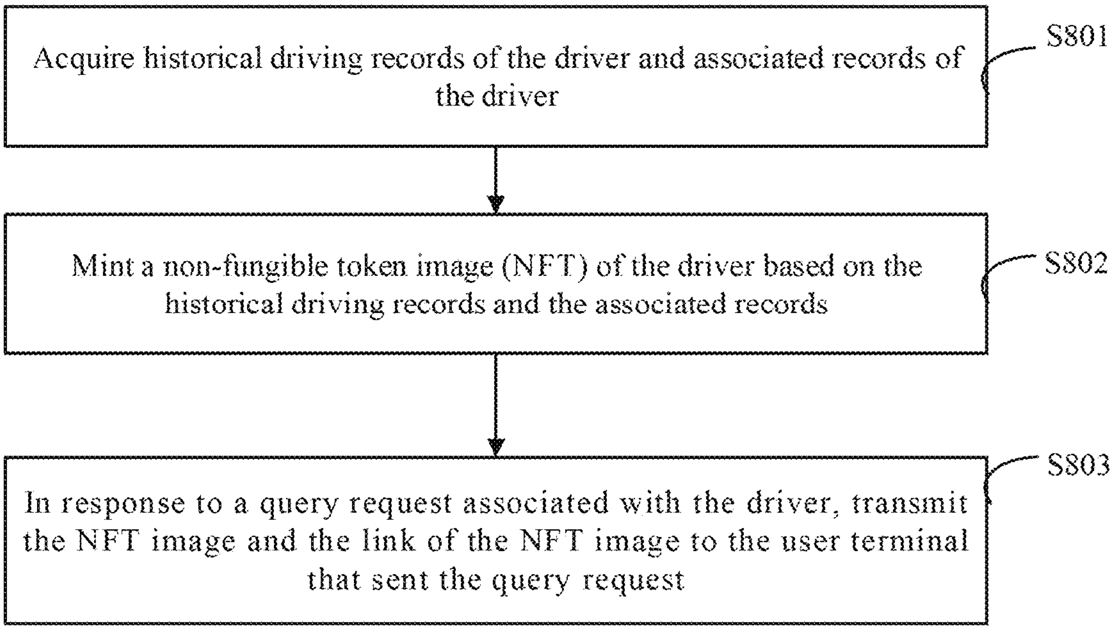
FIG. 8 is a flowchart of a driving record authentication method provided by one embodiment of the present disclosure.

The electronic device 1 includes, but is not limited to, at least one processor 10, a storage device 20, and a computer program 30 (e.g., the driving record authentication system 100 shown in FIG. 5) stored in the storage device 20 and executable by the processor 10). When the processor 10 executes the computer program 30, blocks such as shown in FIG. 6, FIG. 7, and FIG. 8 in the driving record authentication method are implemented. Alternatively, when the processor 10 executes the computer program 30, functions of each module/unit in the driving record authentication system, such as modules 101 to 103 shown in FIG. 5, are implemented.

Exemplarily, the computer program 30 may be divided into one or more modules/units, and the one or more modules/units are stored in the storage device 20 and executed by the processor 10 to complete the disclosure. The one or more modules/units may be a series of computer program segments of instructions capable of performing specific functions, and the segments of instructions are used to describe execution processes of the computer program 30 in the electronic device 1. For example, the computer program 30 can be divided into a registration module 101, a response module 102, and an execution module 103 in FIG. 5. For specific functions of each module, refer to the functions of each module in the embodiment of the driving record authentication system.

Those skilled in the art can understand that the schematic diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 10 may be a central processing unit (CPU), and may also be other general-purpose processors, digital signal processors (DSP), application specific integrated circuits (ASIC), Field-Programmable Gate Array (FPGA) or other programmable logic devices, discrete gate or transistor logic devices, discrete hardware components, and the like. The general-purpose processor can be a microprocessor or the processor 10 can also be any conventional processor, etc. The processor is a control center of the electronic device 1, and uses various interfaces and lines to connect each part of the electronic device 1.

The storage device 20 may be used to store the computer program 30 and/or modules/units, and the processor 10 may call the computer programs and/or modules/units stored in the storage device 20 by running or executing the computer programs and/or modules/units stored in the storage device 20, to realize various functions of the electronic device 1. The storage device 20 may mainly include a first area for storing programs and a second area for storing data, wherein the first area can store an operating device, an application program (such as a sound playback function, an image playback function, etc.) required for at least one function; data (such as audio data, phone book, etc.) created in accordance with a use of the electronic device 1 and the like are stored in the second area. In addition, the storage device 20 may include a high-speed random access memory, and may also include non-volatile storage device, such as hard disk, internal memory, plug-in hard disk, Smart Media Card (SMC), Secure Digital (SD) card, flash, at least one magnetic disk storage device, flash memory device, or other volatile solid state storage device.

Please refer to FIG. 5, which is a functional block diagram of one embodiment of the driving record authentication system of the present disclosure.

In some embodiments, the driving record authentication system 100 operates in the electronic device 1. The driving record authentication system 100 may include a plurality of functional modules composed of program code segments. The program codes of each program segment in the driving record authentication system 100 may be stored in the storage device 20 of the electronic device 1 and executed by the at least one processor 10 to realize the driving record authentication function.

In this embodiment, the driving record authentication system 100 can be divided into a plurality of functional modules according to the functions performed by the driving record authentication system 100. Referring to FIG. 5, the functional modules may include a registration module 101, a response module 102, and an execution module 103. The modules referred to in the present disclosure refer to a series of computer program segments that can be executed by at least one processor and can perform fixed functions, and are stored in the storage device 20. It can be understood that, in other embodiments, the above-mentioned modules may also be program instructions or firmware solidified in the processor 10.

In one embodiment, functions of each module are described below with reference to FIG. 6, FIG. 7, and FIG. 8.

Please refer to FIG. 6, which is a flowchart of registering a user account of the driving record authentication method provided by the present disclosure. According to different requirements, an order of the blocks in the flowchart can be changed, and some blocks can be omitted.

Block S601, the registration module 101 receives a registration request associated with the driver 4, the registration request includes personal information of the driver 4, and the personal information includes an electronic wallet address and identity information of the driver 4, and identification information of the vehicle 3.

In one embodiment, the driver 4 may send the registration request through the user terminal 3. The identity information of the driver 4 may be biometric information that can be used to uniquely authenticate the driver 4, such as face information, fingerprint information, and the like. The identity information of the driver 4 may also include a name, an ID number, a telephone number of the driver 4, and the like.

In one embodiment, the identification information of the vehicle 3 may be an identification number that can be used to uniquely authenticate the vehicle 3, such as a license plate number, and an engine number of the vehicle 3.

Block S602, the registration module 101 assigns a user account to the driver 4 in response to the registration request, and stores the personal information of the driver 4.

In one embodiment, the registration module 101 takes the electronic wallet address of the driver 4 as a user account.

In one embodiment, the registration module 101 associates the electronic wallet address with the identity information of the driver 4 and the identification information of the vehicle 3. The registration module 101 further stores the electronic wallet address and the identity information of the driver 4, and the identification information of the vehicle 3 in the storage device 20 of the electronic device 1 after performing the association.

Please refer to FIG. 7, which is a flowchart of logging in the electronic device of the driving record authentication method provided by the present disclosure. According to different requirements, the order of the blocks in the flowchart can be changed, and some blocks can be omitted.

Block S701, the response module 102 receives a login request associated with the driver 4.

In one embodiment, the processor 401 of the vehicle 3 can send the login request to the vehicle 3 through the wireless communication device 414 when the presence detection device 405 detects that the driver 3 is in the driving position. The login request includes the personal information of the driver 4.

In one embodiment, the processor 401 of the vehicle 3 may send a prompt message to the user terminal 5 through the wireless communication device 414 when the presence detection device 405 detects that the driver 3 is in the driving position. The user terminal 5 may send the personal information of the driver 4 to the vehicle 3 in response to an input of driver 4 when the prompt message is received by the user terminal 5. Therefore, the processor 401 can generate the login request based on the personal information of the driver 4 and send the login request to the electronic device 1 through the wireless communication device 414.

In one embodiment, when the identity information of the driver 4 includes the face information of the driver 4, when the presence detection device 405 detects that the driver 4 is in the driving position, the processor 401 can obtain a face image of the driver 4 by controlling the internal camera device 404 to capture images of the driver 4. The processor 401 can execute the face recognition module 411 to identify the face image of the driver 4, and obtain the face information of the driver 4. In other embodiments, the processor 401 may obtain the personal information of the driver by receiving an input from the driver 4.

Block S702, the execution module 103 determines whether the login request is a valid request. When the execution module 103 determines that the login request is an invalid request, the process goes to block S703. When the execution module 103 determines that the login request is a valid request, the process goes to block S704.

In one embodiment, when the personal information included in the login request is consistent with pre-stored personal information of the driver 4, the execution module 103 determines that the login request is a valid request.

Block S703, when the login request is the invalid request, the execution module 103 does not receive a driving record sent by the vehicle 3, and feeds back a login failure message to the vehicle 3, for example, the execution module 103 transmits a prompt that the login is invalid etc.

Block S704, when the login request is the valid request, the execution module 103 receives the driving record sent by the vehicle 3, and associates the driving record with a current time, and stores the driving record associated with the current time according to the personal information of the driver 4.

In one embodiment, the execution module 103 can feed back information of successful login to the vehicle 3 when the login request is the valid request. When the information of successful login is received by the vehicle 3, the processor 401 of the vehicle 3 can send, to the electronic device 1 through the wireless communication module 414, data from the vehicle speed detection device 402, data from the distance detection device 403, data from the in-vehicle camera device 404, data from the presence detection device 405, and data from the positioning device 406, data from the seat belt detection device 407, data from the acceleration detection device 408, data from the outside camera device 409, data from the signal light recognition module 410, data from the face recognition module 411, data from the electronic map module 412, and data from the driver status analysis module 413. That is, the processor 401 can send real-time driving record of the vehicle 3 to the electronic device 1 after receiving the information of successful login, so that the execution module 103 can receive the driving record of the vehicle 3 sent by the vehicle 3.

In one embodiment, the driving record of the vehicle 3 includes, but is not limited to: a speed, an acceleration, a position of the vehicle 3, traffic rules corresponding to the position, distances between the vehicle 3 and surrounding vehicles and/or surrounding objects, a usage status of a seat belt of the driver 4 of the vehicle 3, a mental state of the driver 4, and a traffic light in front of the vehicle 3.

In one embodiment, the execution module 103 stores the driving record of the vehicle 3 according to the personal information of the driver 4 by associating the driving record with the personal information of the driver 4 and storing the driving record associated with the personal information.

Please refer to FIG. 8, which is a flowchart of one embodiment of a driving record authentication method provided by the present disclosure. According to different requirements, the order of the blocks in the flowchart can be changed, and some blocks can be omitted.

Block S801, the execution module 103 periodically (for example, on the 10th of each month or once every two weeks) acquires historical driving records of the driver 4 and associated records of the driver 4.

It can be understood that the execution of this block may be performed at any time after blocks S701-S704.

In one embodiment, the historical driving records of the driver 4 includes the driving records of the driver 4 within a preset time period, and each of the driving record includes, but is limited to: a driving speed, an acceleration, location information, traffic rules corresponding each location, distances between the vehicle 3 and surrounding vehicles and/or surrounding objects, a use status of the seat belt of the driver 4 of the vehicle 3, a mental state of the driver 4, traffic lights in front of the vehicle 3.

In one embodiment, the preset time period may be the last year or last month. In other embodiments, the driving records within the preset time period may include all driving records of the driver 4.

The associated records of the driver 4 include, but are not limited to: accident records (traffic accident records, criminal records), a time of collecting a driver license, a current state of the driver license (that is, whether the driver license is in a valid state), a total driving mileage, and passengers' evaluation records (including positive reviews and negative reviews) of the driver 4 in one or more preset ride-hailing platforms (such as uber, Didi Chuxing, Meituan Taxi, etc.), and records of recommendation and reward.

In one embodiment, the execution module 103 may obtain the associated records from the one or more preset ride-hailing platforms and a network platform of a government agency, such as a public account, a website, and the like.

Block S802, the execution module 103 mints a non-fungible token (NFT) image of the driver 4 based on the historical driving records and the associated records.

In this embodiment, a NFT protocol (a connection with the blockchain) used in this disclosure can be the ERC-721 protocol or the ERC-1155 protocol. It should be noted that the ERC-721 protocol and the ERC-1155 protocol are smart contract protocols used on the Ethereum blockchain.

In a first embodiment, the minting the non-fungible token image of the driver 4 based on the historical driving records and associated records includes: obtaining an analysis result of each record of the historical driving records and associated records by analyzing the historical driving records and the associated records, and obtaining a plurality of behavior records of the driver 4 based on the analysis result of each record; obtaining a plurality of image badges by separately creating an image badge for each of the plurality of behavior records; and minting an NFT image of the driver 4 based on the plurality of image badges.

In one embodiment, the plurality of behavior records includes, but are not limited to, no accident record, no illegal driving record, no dangerous driving record, a rate of positive reviews, and a record of recommendation and reward.

In one embodiment, the obtaining the analysis result of each record of the historical driving records and associated records by analyzing the historical driving records and the associated records includes:

Determining whether the acceleration is less than a preset threshold value from the historical driving records;

Determining whether the driver 4 uses a seat belt from the historical driving record;

Determining whether the distance between the vehicle 3 and a surrounding vehicle and/or an object is within a preset distance value, from the historical driving records;

Determining whether the vehicle 3 is over speeding according to the driving speed and the location information included in the historical driving records;

Determining whether the vehicle 3 turns illegally according to the driving speed and continuous location information included in the historical driving records;

Determining whether the vehicle 3 is illegally parked according to the driving speed and continuous location information included in the historical driving records;

Determining whether the vehicle 3 violates traffic rules according to the driving speed and location information and traffic lights included in the historical driving records;

Determining whether the driver 4 has performed an act in violation of traffic safety according to an image of the driver 4 included in the historical driving records; Determining whether the driver license of the driver 4 is in a valid state according to the associated records;

Determining whether the driver 4 has an accident record according to the associated records;

Determining whether the rate of positive reviews is greater that a preset value according to the associated records; and Determining whether the driver 4 has a record of recommendation and reward according to the associated records.

In one embodiment, the execution module 103 also counts a number of years that the driver 4 has achieved each of the plurality of behavior records according to the collection time of the driver license. For example, the execution module 103 determines that begin from the collection time of the driver license, the driver 4 has achieved a record of no accident for one year, achieved a record of no illegal driving for one year, achieved a record of no dangerous driving for one year, and achieved a rate of positive reviews greater than 80% for one year, and achieved a record of recommendation and reward for one year.

In one embodiment, the image badge may refer to an image including one or more graphics. In one embodiment, the image badge created by the execution module 103 for each behavior record have a same size or different sizes.

Figure 9:
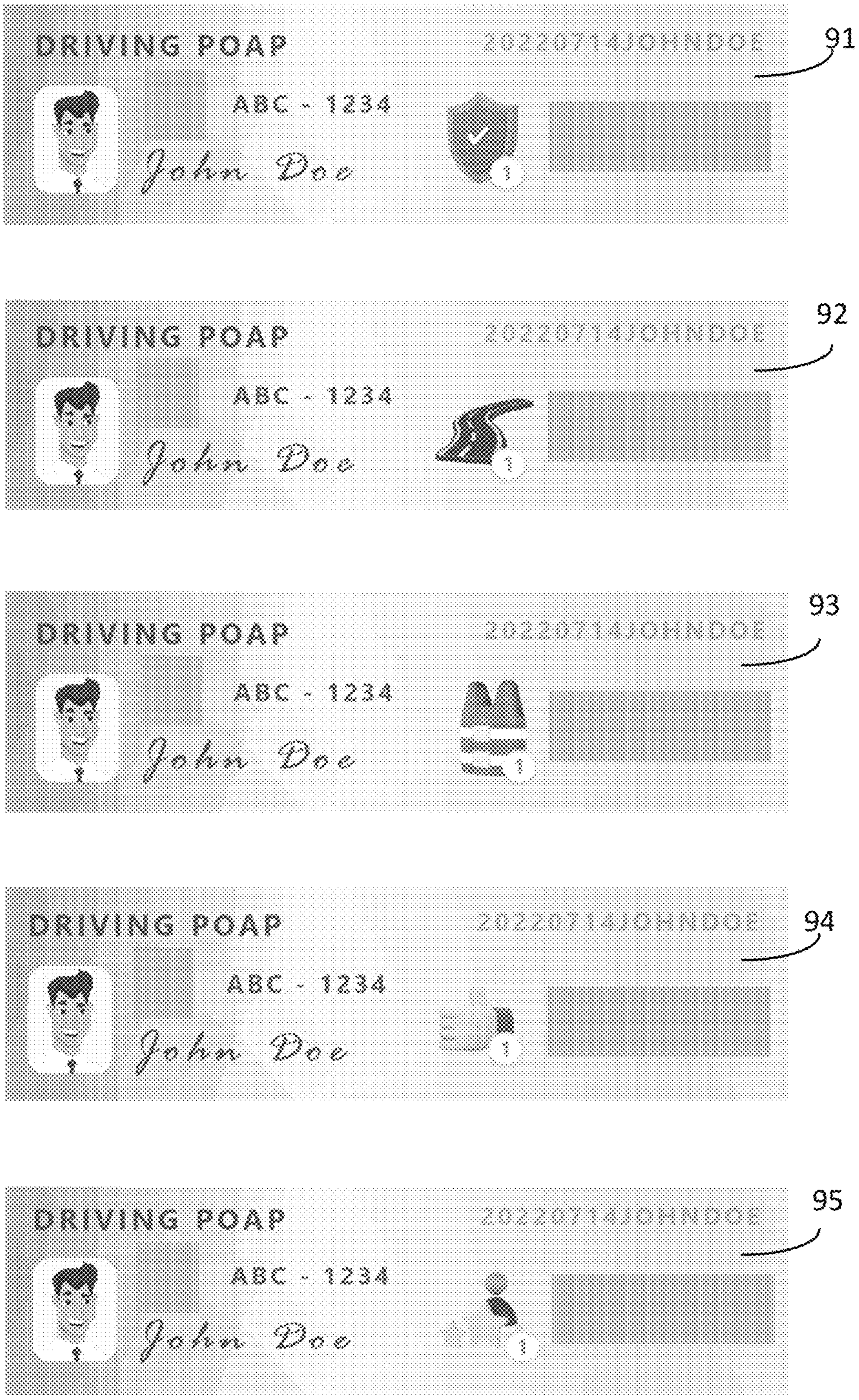
FIG. 9 illustrates a plurality of image badges provided by one embodiment of the present disclosure.
Figure 10:
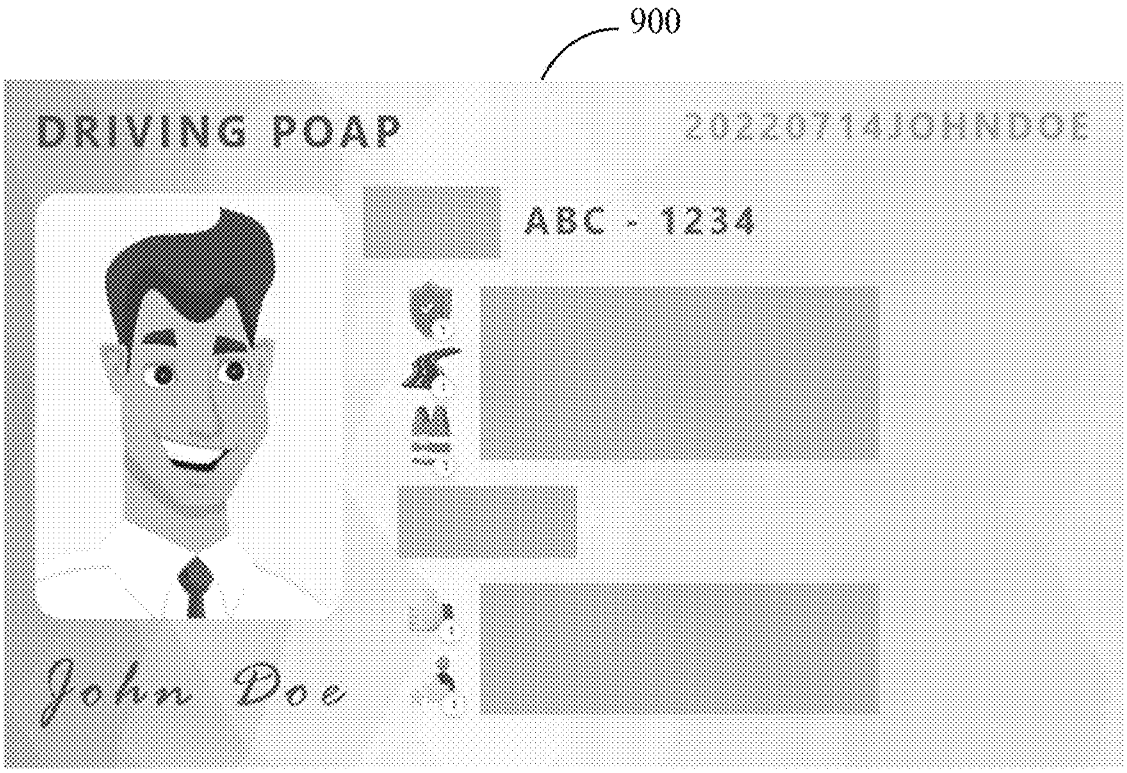
FIG. 10 illustrates an NFT image provided by one embodiment of the present disclosure.

For example, as shown in FIG. 9, the execution module 103 generates image badges 91-95 correspondingly according to the number of years of each behavior record of the plurality of behavior records (namely, no accident record, no illegal driving record, no dangerous driving record, a rate of positive reviews, and a record of recommendation and reward) of the driver 4. Referring to FIG. 10, the execution module 103 mints a NFT image 900 of the driver 4 based on the plurality of image badges. In one embodiment, the execution module 103 mints the NFT image of the driver 4 based on the plurality of image badges, a current time, and the personal information of the driver 4.

In one embodiment, the NFT image of the driver 4 includes a time of generating the NFT image (e.g., 20220714 shown in FIG. 10), a name (e.g., JOHN DOE shown in FIG. 10) and the face image of the driver 4, the identification information of the vehicle 3 driven by the driver 4 (e.g., ABC-1234 shown in FIG. 10), and the plurality of behavior records.

In a second embodiment, the minting the non-fungible token image of the driver based on the historical driving records and the associated records includes: obtaining an analysis result of each record of the historical driving records and the associated records by analyzing the historical driving records and the associated records; obtaining a plurality of behavior records of the driver based on the analysis result of each record; obtaining a plurality of NFT image badges by corresponding creating an NFT image badge for each of the plurality of behavior records; and determining the plurality of NFT image badges as the NFT image of the driver.

In a third embodiment, it is assumed that the historical driving records include historical location information of the driver, and the associated records include the status information of the driver license and the total driving mileage. In one embodiment, the minting the non-fungible token image of the driver based on the historical driving records and the associated records includes: obtaining a percentage ranking of driving mileage based on the historical location information of the driver and historical location information of each driver of other drivers, the percentage ranking of driving mileage includes a percentage ranking of the total driving mileage, a percentage ranking of a distribution of a first driving area, a percentage ranking of a distribution of a second driving area; and minting an NFT image corresponding to the percentage ranking of the total driving mileage, and displaying, on the NFT image, the percentage ranking of the total driving mileage and status information of the driver license.

In one embodiment, the status information of the driver license includes a collection time of each of all driver licenses of the driver and a valid period of each driver license. For example, the status information of the driver license includes: a driver license corresponding to a passenger car has been valid since 2001.10.10, a driver license corresponding to a bus was valid from 2005.11.11 to 2010.6.29, and was invalid from 2010.6.30 to 2018.10.10, and has been valid since 2018.10.11.

In one embodiment, the percentage ranking of the distribution of the first driving area of the driver includes: a percentage ranking of mileage in urban areas, a percentage ranking of mileage in suburban areas, and a percentage ranking of mileage in mountainous areas; the percentage ranking of the distribution of the second driving area of the driver includes: a percentage ranking of mileage corresponding to each municipal administrative area.

For example, based on the historical location information of the driver and the historical location information of each driver of the other drivers, the total driving mileage of the driver 4 is 83,000 km, and the corresponding percentage ranking is 80%. The driving mileage in the urban area is 30,000 km, and the corresponding percentage ranking is 90%, the driving mileage in the suburbs is 50,000 km, and the corresponding percentage ranking is 50%; the driving mileage in the mountainous area is 3,000 km, and the corresponding percentage ranking is 10%. The driving mileage corresponding to each of the municipal administrative areas include: a driving mileage of Taipei is 50,000 km, a driving mileage of Taoyuan is 30,000 km, and a driving mileage of Taichung is 3,000 km. The percentage ranking of the driving mileage corresponding to each municipal administrative area includes: the percentage ranking of Taipei's mileage is 80%, the percentage ranking of Taoyuan's mileage is 40%, and the percentage ranking of Taichung's mileage is 10%.

When the percentage ranking of the total driving mileage is greater than or equal to 80%, the execution module 103 mints a first NFT image, and displays the percentage ranking of the total driving mileage and the status information of the driver license on the first NFT image.

By analogy, when the percentage ranking of the total driving mileage is between 60% and 80%, the execution module 103 mint a second NFT image, and displays the percentage ranking of the total driving mileage and the status information of the driver license on the second NFT image. When the percentage ranking of the total mileage is between 40% and 60%, the execution module 103 mints a third NFT image, and displays the percentage ranking of the total driving mileage and the status information of the driver license on the third NFT image. When the percentage ranking of the total mileage is between 20% and 40%, the execution module 103 mints a fourth NFT image, and displays the percentage ranking of the total driving mileage and the status information of the driver license on the fourth NFT image. When the percentage ranking of the total driving mileage is between 0% and 20%, the execution module 103 casts a fifth NFT image, and displays the percentage ranking of the total driving mileage and the status information of the driver license on the fifth NFT image.

In a fourth embodiment, the minting the non-fungible token image of the driver based on the historical driving records and the associated records includes: determining a lever of the driver 4 based on the historical driving records and the associated records; and generating a non-fungible token image of the driver 4 corresponding to the level of the driver 4.

In one embodiment, the execution module 103 may predefine a plurality of levels, for example, the plurality of levels include: level 1, level 2, level 3, and the execution module 103 predefines level 1 as the highest level, predefines level 2 as the second level, predefines level 3 as the lowest level. Of course, in other embodiments, the execution module 103 predefines the plurality of levels in other manners.

In one embodiment, the determining the lever of the driver 4 based on the historical driving records and the associated records includes:

Invoking a pre-trained level recognition model; and obtaining the lever of the driver 4 by inputting the historical driving records and the associated records in the pre-trained level recognition model.

In one embodiment, the method for training the level recognition model by the executing module 103 includes:

Obtaining a preset number of sample data corresponding to different levels, each sample data includes driving records and associated records; labeling each sample data corresponding to each level with a category, making the sample data corresponding to each level including a category label; determining the preset number of sample data including the category labels as training samples;

Randomly dividing the training samples into a training set and a verification set, the training set including a first preset ratio of the preset number of sample data, and the verification set including a second preset ratio of the preset number of sample data; obtaining the level recognition model by training a deep neural network using the training set, and verifying an accuracy rate of the level recognition model by using the verification set; and Ending the training if the accuracy rate is greater than or equal to a preset accuracy rate; if the accuracy rate is less than the preset accuracy rate, increasing a number of the training samples to retrain the deep neural network until the accuracy rate of the level recognition model is greater than or equal to the preset accuracy rate.

In one embodiment, the minting the NFT image corresponding to the level for the driver 4 includes: minting a NFT image template corresponding each level; invoking the NFT image template corresponding to the level of the driver 4 when the level of the driver 4 is determined; and minting the NFT image of the driver 4 based on a current time and the personal information of the driver 4 using the invoked NFT image template.

Figure 11:
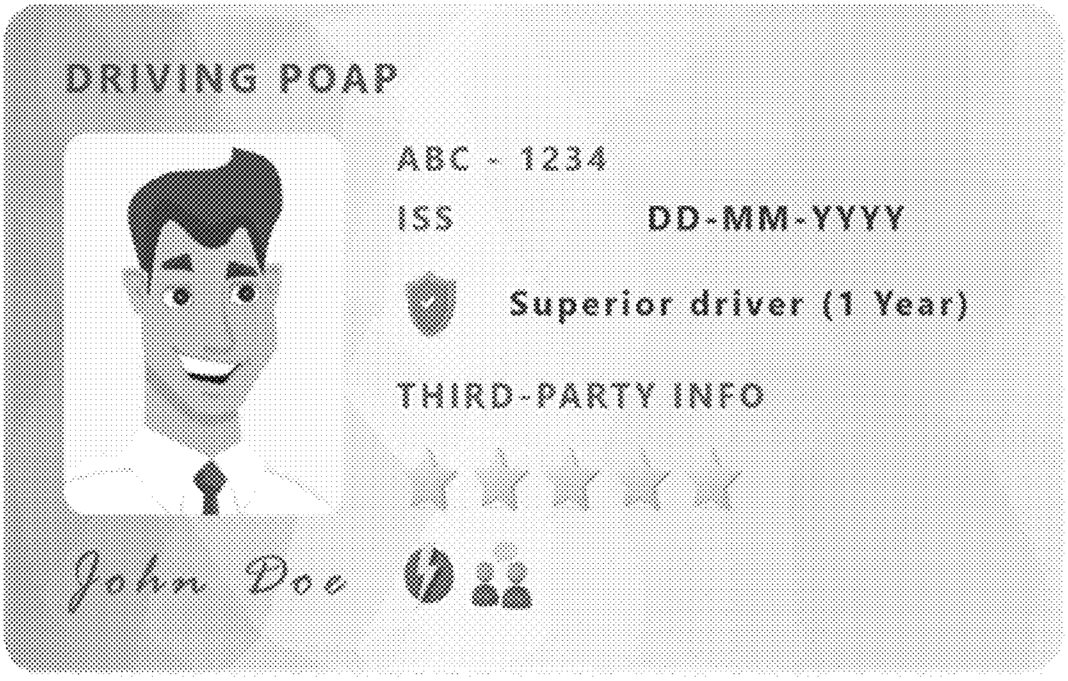
FIG. 11 illustrates another NFT image provided by one embodiment of the present disclosure.

As shown in FIG. 11, in one embodiment, the NFT image may include, but is not limited to: a name and a grade of the driver 4, a valid expiration time of the driver license, the identification information of vehicle 3 that the driver 4 drives, the passengers' evaluation records (including positive reviews and negative reviews) of the driver 4 in one or more preset ride-hailing platforms (such as uber, Didi Chuxing, Meituan Taxi, etc.), and records of recommendation and reward.

In other embodiments, the determining the level of the driver 4 based on the driving records and associated records includes: obtaining an analysis result of each record by analyzing the historical driving records and associated records; obtaining quantitative data by quantifying the analysis result of each record; and determining the level of the driver based on the quantitative data.

In one embodiment, the execution module 103 quantifies the analysis result of each record by assigning different scores to different analysis results. For example, a first score is assigned for the acceleration exceeding the threshold value, and a second score higher than the first score is assigned for the acceleration not exceeding the threshold value. Similarly, a third score is assigned for the driver uses the seat belt, and a fourth score lower than this third score is assigned for the driver does not use the seat belt. In a similar manner, the execution module 103 may assign scores for other analysis results respectively, thereby achieving data quantification.

In one embodiment, the execution module 103 may pre-determine different scores corresponding to different levels. The execution module 103 calculates an average value of the quantified data, and based on the average value, the level of the driver 4 can be determined.

In one embodiment, the execution module 103 further stores the NFT image and obtains a link of the NFT image. The link of the NFT image indicates a storing position of the NFT image in the blockchain 2. The execution module 103 may also generate a two-dimensional code corresponding to the link of the NFT image.

Block S803, the execution module 103, in response to a query request associated with the driver 4, transmits the NFT image and the link of the NFT image to the user terminal 5 that sent the query request.

In other embodiments, the execution module 103 may also transmit the NFT image and the link of the NFT image to the vehicle 3 which sends the query request in response to the query request.

For example, when the present disclosure is applied to a taxi-hailing platform, and the passenger needs to know the driver 4 in advance, the driver 4 may be required to provide the NFT image. Then the driver 4 can use the user terminal 5 to send the query request to the electronic device 1, and the query request can include the identity information of the driver 4, the identification information of the vehicle 3, the user account, and the like. The execution module 103 can send the NFT image reflecting an overall situation of the driver 4 to the user terminal 5 and/or the vehicle 3 when the query request is received.

In other embodiments, the user terminal 5 may refer to a terminal of another user. For example, the passenger can send the query request through a personal terminal such as a mobile phone, and obtain the NFT image of the driver 4, the link of the NFT image, and/or the quick response code (QR code). In other embodiments, the user terminal 5 may communicate with the electronic device through other NFC (Near-Field Communication) technology such as RFID (Radio-frequency identification), Infrared (IR), and Bluetooth.

It should be noted that, in this embodiment, the execution module 103 also sends the link of the NFT image to a query terminal, such as the user terminal 5 or the vehicle 3, so that the query terminal or other terminals can access the blockchain 2 through the link and obtains the NFT image of the driver 4, and can compare the obtained NFT image with the NFT image provided by the driver 4 through the user terminal 5 or the vehicle 3, and determine whether the NFT image provided by the driver 4 is real or not.

Figure 12:
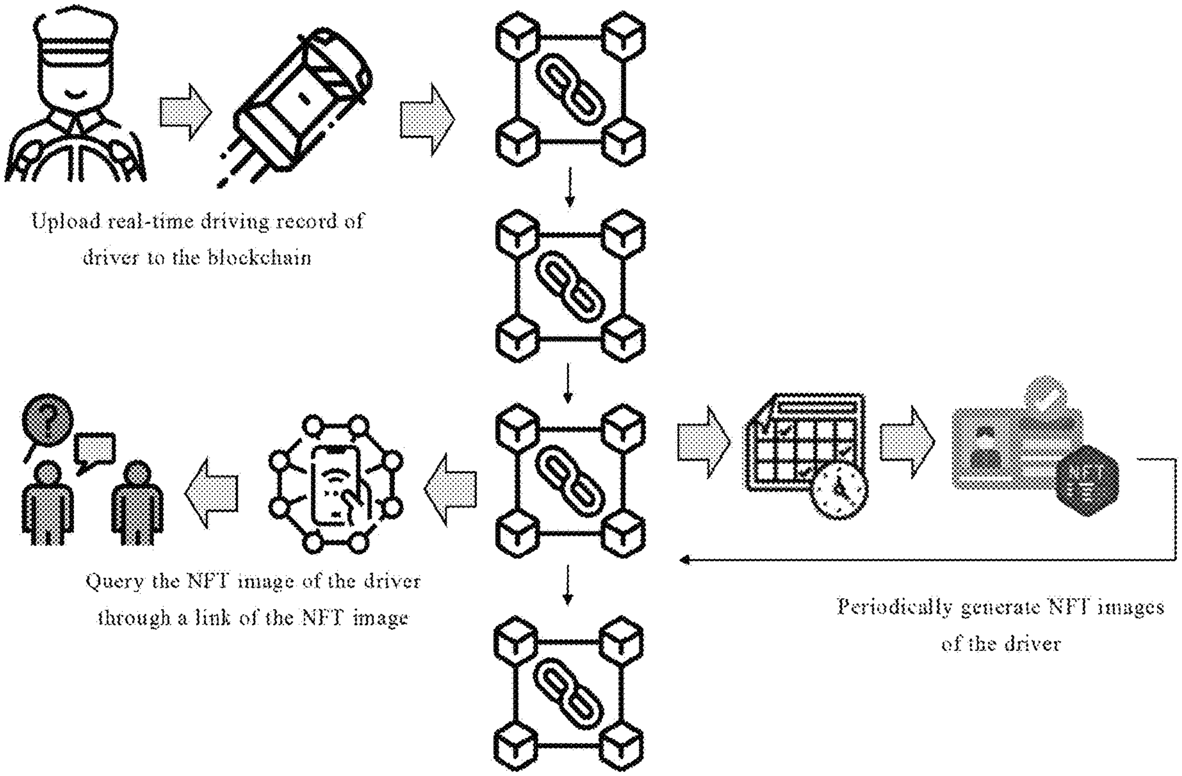
FIG. 12 illustrates a flow of a method for performing the driving record authentication provided by one embodiment of the present disclosure.

For a clear understanding of the present disclosure, FIG. 12 illustrates a flow for performing driving record authentication. As can be seen from FIG. 12, the vehicle 3 uploads the real-time driving record of driver 4 to the blockchain when the driver 4 drives the vehicle 3, and the smart contract of the blockchain periodically generates NFT images of the driver 4 based on the historical driving records. The user or the driver 4 can query the NFT image of the driver 4 through a terminal such as a mobile phone. In one embodiment, A passenger of the vehicle 3 can obtain the NFT image of the driver 4 from the blockchain through the link of the NFT image provided by the driver 4.

In other embodiments, the execution module 103 may further perform corresponding restriction measures to the driver 4 based on the NFT image of the driver 4.

In one embodiment, the restriction measures include, but are not limited to, restricting or limiting a drive-able area and/or a driving mode of the driver 4.

In one embodiment, the execution module 103 can restrict the drive-able area and/or the driving mode of the driver 4 based on reference information, so as to realize management of traffic flow.

In one embodiment, the reference information may include a type of the vehicle 4 (for example, the vehicle 4 is two-wheeled or four-wheeled, and a driving mode of the vehicle 4 is two-wheel drive or four-wheel drive) driven by the driver 4, the current status of the driver license (for example, the driver license currently is valid and the driver has no accident record), the historical driving records, and road condition information obtained from electronic maps (such as Baidu Maps, Google Maps, etc.).

For example, if the percentage ranking of the driving mileage of the driver 4 in the mountainous area is less than or equal to 20%, the driver 4 is restricted from driving to the mountainous area.

For another example, the driver 4 is restricted to only drive a four-wheeled vehicle to the highway, and the driver 4 whose total driving mileage less than 1000 km is restricted from driving the vehicle to the highway.

For another example, the driver 4 is restricted to only drive a four-wheeled vehicle to the highway, and if the total driving mileage of the driver 4 does not exceed 5000 km, a speed is limited to be less than 80 km/h.

If the modules/units integrated in the electronic device 1 are implemented in a form of software functional units and sold or used as independent products, they may be stored in a computer-readable storage medium. Based on this understanding, the present disclosure can implement all or part of the processes in the methods of the above embodiments, and can also be completed by instructing relevant hardware through a computer program, and the computer program can be stored in a computer-readable storage medium, and when the computer program is executed by the processor, the blocks of the above method embodiments can be implemented. Wherein, the computer program includes computer program code, and the computer program code may be in the form of source code, object code, executable file or some intermediate form, and the like.

The computer-readable storage medium may include: any entity or device capable of carrying the computer program code, a recording medium, a U disk, a removable hard disk, a magnetic disk, an optical disk, a computer memory, a read-only memory (ROM), random access memory (RAM), electric carrier signal, telecommunication signal and software distribution medium, etc. It should be noted that the content contained in the computer-readable media may be appropriately increased or decreased according to the requirements of legislation and patent practice in the jurisdiction, for example, in some jurisdictions, according to legislation and patent practice, the computer-readable media Electric carrier signals and telecommunication signals are not included.

It will be apparent to those skilled in the art that the present disclosure is not limited to the details of the above-mentioned exemplary embodiments, and that the present disclosure can be implemented in other specific forms without departing from the spirit or essential characteristics of the present disclosure. Therefore, the embodiments are to be regarded in all respects as illustrative and not restrictive, and the scope of the present disclosure is defined by the appended claims rather than the foregoing description, which are therefore intended to fall within the scope of the claims. All changes within the meaning and scope of equivalents of the requirements are included in this disclosure. Any reference signs in the claims shall not be construed as limiting the involved claim. Furthermore, it is clear that the word “comprising” does not exclude other units or steps and the singular does not exclude the plural. Several units or means recited in a device claim can also be realized by one and the same unit or means by means of software or hardware. The terms first, second, etc. are used to denote names and do not denote any particular order.

Finally, it should be noted that the above embodiments are only used to illustrate the technical solutions of the present disclosure and not to limit them. Although the present disclosure has been described in detail with reference to the preferred embodiments, those of ordinary skill in the art should understand that the technical solutions of the present disclosure can be Modifications or equivalent substitutions can be made without departing from the spirit and scope of the technical solutions of the present disclosure.

What is claimed is:

1. A driving record authentication method, applied to an electronic device serving as a node of a blockchain, the driving record authentication method comprising:

receiving a login request from a vehicle, the login request being generated based on personal information of a driver of the vehicle in response that the driver is detected to be in a driving position of the vehicle;

in response that the login request is a valid request, receiving real-time driving record of the driver, associating the real-time driving record with a current time, and storing the real-time driving record associated with the current time to the blockchain according to personal information of the driver;

periodically acquiring historical driving records of the driver and acquiring associated records of the driver, the historical driving records comprising driving records of the driver within a preset time period;

determining a level of the driver based on the historical driving records and the associated records;

minting a non-fungible token (NFT) image corresponding to the level of the driver;

in response to a query request associated with the driver, transmitting the NFT image to a user terminal that sent the query request; and performing a restriction measure to the driver based on the NFT image.

2. The driving record authentication method according to claim 1, wherein minting the NFT image corresponding to the level of the driver comprises:

minting a NFT image template corresponding each of a plurality of levels;

invoking the NFT image template corresponding to the level of the driver in response that the level of the driver is determined; and minting the NFT image corresponding to the level of the driver based on a current time and personal information of the driver using the invoked NFT image template.

3. The driving record authentication method according to claim 1, wherein determining the level of the driver based on the historical driving records and the associated records comprises:

invoking a level recognition model; and obtaining the level of the driver by inputting the historical driving records and the associated records in the level recognition model.

4. The driving record authentication method according to claim 3, further comprising:

training the level recognition model by:

obtaining a preset number of sample data corresponding to different levels, each sample data comprising driving records and associated records; labeling each sample data corresponding to each level with a category, making the sample data corresponding to each level comprising a category label; determining the preset number of sample data comprising the category labels as training samples;

randomly dividing the training samples into a training set and a verification set, the training set comprising a first preset ratio of the preset number of sample data, and the verification set comprising a second preset ratio of the preset number of sample data; obtaining the level recognition model by training a deep neural network using the training set, and verifying an accuracy rate of the level recognition model by using the verification set; and ending a training in response that the accuracy rate is greater than or equal to a preset accuracy rate; increasing, in response that the accuracy rate is less than the preset accuracy rate, a number of the training samples to retrain the deep neural network until the accuracy rate of the level recognition model is greater than or equal to the preset accuracy rate.

5. The driving record authentication method according to claim 1, wherein determining the level of the driver based on the historical driving records and the associated records comprises:

obtaining an analysis result of each record in the historical driving records and the associated records;

obtaining quantitative data by quantifying the analysis result of each record; and determining the level of the driver based on the quantitative data.

6. The driving record authentication method according to claim 5, wherein quantifying the analysis result of each record comprises:

assigning different scores to different analysis results;

wherein determining the level of the driver based on the quantitative data comprises:

pre-determining different scores corresponding to different levels; and calculating an average value of the quantified data, and determining the level of the driver based on the average value.

7. The driving record authentication method according to claim 1, wherein performing the restriction measure comprises restricting a drive-able area and/or a driving mode of the driver, and comprising at least one of following:

obtaining a percentage ranking of driving mileage of the driver in a mountainous area, and in response to the percentage ranking being less than or equal to a first preset threshold, restricting the driver from driving to the mountainous area;

obtaining a total driving mileage of the driver, and in response to the total driving mileage being less than a second preset threshold, restricting the driver from driving the vehicle to a highway;

obtaining a total driving mileage of the driver, and in response to the total driving mileage being less than a third preset threshold, limiting a driving speed of the driver to be less than a preset speed value.

8. An electronic device serving as a node of a blockchain, comprising:

a storage device;

at least one processor; and the storage device storing one or more programs, which when executed by the at least one processor, cause the at least one processor to:

receive a login request from a vehicle, the login request being generated based on personal information of a driver of the vehicle in response that the driver is detected to be in a driving position of the vehicle;

in response that the login request is a valid request, receive real-time driving record of the driver, associating the real-time driving record with a current time, and store the real-time driving record associated with the current time to the blockchain according to personal information of the driver;

periodically acquire historical driving records of the driver and acquire associated records of the driver, the historical driving records comprising driving records of the driver within a preset time period;

determine a level of the driver based on the historical driving records and the associated records;

mint a non-fungible token (NFT) image corresponding to the level of the driver;

in response to a query request associated with the driver, transmit the NFT image to a user terminal that sent the query request; and perform a restriction measure to the driver based on the NFT image.

9. The driving record authentication method according to claim 8, wherein the at least one processor mints the NFT image corresponding to the level of the driver by:

minting a NFT image template corresponding each of a plurality of levels;

invoking the NFT image template corresponding to the level of the driver in response that the level of the driver is determined; and minting the NFT image corresponding to the level of the driver based on a current time and personal information of the driver using the invoked NFT image template.

10. The driving record authentication method according to claim 8, wherein the at least one processor determines the level of the driver based on the historical driving records and the associated records by:

invoking a level recognition model; and obtaining the level of the driver by inputting the historical driving records and the associated records in the level recognition model.

11. The driving record authentication method according to claim 10, wherein the at least one processor is further caused to:

train the level recognition model by:

obtaining a preset number of sample data corresponding to different levels, each sample data comprising driving records and associated records; labeling each sample data corresponding to each level with a category, making the sample data corresponding to each level comprising a category label; determining the preset number of sample data comprising the category labels as training samples;

randomly dividing the training samples into a training set and a verification set, the training set comprising a first preset ratio of the preset number of sample data, and the verification set comprising a second preset ratio of the preset number of sample data; obtaining the level recognition model by training a deep neural network using the training set, and verifying an accuracy rate of the level recognition model by using the verification set; and ending a training in response that the accuracy rate is greater than or equal to a preset accuracy rate; increasing, in response that the accuracy rate is less than the preset accuracy rate, a number of the training samples to retrain the deep neural network until the accuracy rate of the level recognition model is greater than or equal to the preset accuracy rate.

12. The driving record authentication method according to claim 8, wherein the at least one processor determines the level of the driver based on the historical driving records and the associated records by:

obtaining an analysis result of each record in the historical driving records and the associated records;

obtaining quantitative data by quantifying the analysis result of each record; and determining the level of the driver based on the quantitative data.

13. The driving record authentication method according to claim 12, wherein the at least one processor quantifies the analysis result of each record by:

assigning different scores to different analysis results;

wherein the at least one processor determines the level of the driver based on the quantitative data by:

pre-determining different scores corresponding to different levels; and calculating an average value of the quantified data, and determining the level of the driver based on the average value.

14. The driving record authentication method according to claim 8, wherein the at least one processor is further caused to:

wherein the at least one processor performs the restriction measure comprises restricting a drive-able area and/or a driving mode of the driver, and comprising at least one of following:

obtaining a percentage ranking of driving mileage of the driver in a mountainous area, and in response to the percentage ranking being less than or equal to a first preset threshold, restricting the driver from driving to the mountainous area;

obtaining a total driving mileage of the driver, and in response to the total driving mileage being less than a second preset threshold, restricting the driver from driving the vehicle to a highway;

obtaining a total driving mileage of the driver, and in response to the total driving mileage being less than a third preset threshold, limiting a driving speed of the driver to be less than a preset speed value.

15. A non-transitory storage medium having instructions stored thereon, when the instructions are executed by a processor of an electronic device serving as a node of a blockchain, the processor is caused to perform a driving record authentication method, wherein the driving record authentication method comprises:

receiving a login request from a vehicle, the login request being generated based on personal information of a driver of the vehicle in response that the driver is detected to be in a driving position of the vehicle;

in response that the login request is a valid request, receiving real-time driving record of the driver, associating the real-time driving record with a current time, and storing the real-time driving record associated with the current time to the blockchain according to personal information of the driver;

periodically acquiring historical driving records of a driver and acquiring associated records of the driver, the historical driving records comprising driving records of the driver within a preset time period;

determining a level of the driver based on the historical driving records and the associated records;

minting a non-fungible token (NFT) image corresponding to the level of the driver;

in response to a query request associated with the driver, transmitting the NFT image to a user terminal that sent the query request; and performing a restriction measure to the driver based on the NFT image.

16. The non-transitory storage medium according to claim 15, wherein minting the NFT image corresponding to the level of the driver comprises:

minting a NFT image template corresponding each of a plurality of levels;

invoking the NFT image template corresponding to the level of the driver in response that the level of the driver is determined; and minting the NFT image corresponding to the level of the driver based on a current time and personal information of the driver using the invoked NFT image template.

17. The non-transitory storage medium according to claim 15, wherein determining the level of the driver based on the historical driving records and the associated records comprises:

invoking a level recognition model; and obtaining the level of the driver by inputting the historical driving records and the associated records in the level recognition model.

18. The non-transitory storage medium according to claim 17, wherein the method further comprises:

training the level recognition model by:

obtaining a preset number of sample data corresponding to different levels, each sample data comprising driving records and associated records; labeling each sample data corresponding to each level with a category, making the sample data corresponding to each level comprising a category label; determining the preset number of sample data comprising the category labels as training samples;

randomly dividing the training samples into a training set and a verification set, the training set comprising a first preset ratio of the preset number of sample data, and the verification set comprising a second preset ratio of the preset number of sample data; obtaining the level recognition model by training a deep neural network using the training set, and verifying an accuracy rate of the level recognition model by using the verification set; and ending a training in response that the accuracy rate is greater than or equal to a preset accuracy rate; increasing, in response that the accuracy rate is less than the preset accuracy rate, a number of the training samples to retrain the deep neural network until the accuracy rate of the level recognition model is greater than or equal to the preset accuracy rate.

19. The non-transitory storage medium according to claim 15, wherein determining the level of the driver based on the historical driving records and the associated records comprises:

obtaining an analysis result of each record in the historical driving records and the associated records;

obtaining quantitative data by quantifying the analysis result of each record; and determining the level of the driver based on the quantitative data.

20. The non-transitory storage medium according to claim 19, wherein quantifying the analysis result of each record comprises:

assigning different scores to different analysis results;

wherein determining the level of the driver based on the quantitative data comprises:

pre-determining different scores corresponding to different levels; and calculating an average value of the quantified data, and determining the level of the driver based on the average value.

* * * * *